(12) United States Patent
Kasaini

(10) Patent No.: US 8,168,069 B2
(45) Date of Patent: May 1, 2012

(54) ENRICHMENT PROCESS FOR A PGM-METALS CONTAINING STREAM

(75) Inventor: Henry Kasaini, Pretoria West (ZA)

(73) Assignee: Tshwane University of Technology, Pretoria West (ZA)

( * ) Notice: Subject to any disclaimer, the term of this patent is extended or adjusted under 35 U.S.C. 154(b) by 258 days.

(21) Appl. No.: 12/669,558

(22) PCT Filed: Jul. 28, 2008

(86) PCT No.: PCT/ZA2008/000067
§ 371 (c)(1),
(2), (4) Date: Feb. 9, 2010

(87) PCT Pub. No.: WO2009/018592
PCT Pub. Date: Feb. 5, 2009

(65) Prior Publication Data
US 2010/0213133 A1    Aug. 26, 2010

(30) Foreign Application Priority Data
Jul. 27, 2007   (ZA) .................................. 2007/6234

(51) Int. Cl.
*B01J 49/00*   (2006.01)
(52) U.S. Cl. ........................................ 210/670; 210/673
(58) Field of Classification Search .................. 210/670, 210/673
See application file for complete search history.

(56) References Cited

U.S. PATENT DOCUMENTS

| | | | | |
|---|---|---|---|---|
| 1,782,850 A * | 11/1930 | Hill | ............................... | 210/673 |
| 3,294,483 A * | 12/1966 | Hirschberg | ..................... | 423/22 |
| 4,329,321 A * | 5/1982 | Dalton et al. | ................... | 423/22 |
| 5,013,698 A * | 5/1991 | Lonsinger et al. | .............. | 502/27 |
| 5,141,913 A * | 8/1992 | Vanlautem | .................... | 502/406 |
| 2006/0106248 A1* | 5/2006 | Scaia et al. | ..................... | 562/17 |

FOREIGN PATENT DOCUMENTS

GB           335565 A      9/1930

* cited by examiner

*Primary Examiner* — Chester Barry
(74) *Attorney, Agent, or Firm* — Knobbe Martens Olson & Bear LLP

(57) ABSTRACT

The invention provides an enrichment process for a PGM-group metals containing stream, said process including the steps of contacting activated carbon particles with a PGM-rich stream by contacting the stream with a batch of the particles on a continuous basis, whereby at least some of the PGM-group metals are adsorbed from the stream onto active surface sites of the activated carbon and a PGM-metals depleted stream passes out of contact with the activated carbon batch, thereafter stripping the PGM-group metals from the activated carbon batch by means of a concentrated HCl solution as stripping agent, wherein the stripping agent is contacted with the activated carbon batch on a continuous flow basis and the PGM-group metals loaded stripping agent is removed from contact with the activated carbon from which the PGM-group metals have been stripped, and then regenerating the activated carbon batch by washing with water and, if necessary, reactivating the carbon particles.

19 Claims, 9 Drawing Sheets

Fig. 4 Adsorption vs. Solution pH.

$[Pt]_o = [Fe]_o = [Cr]_o = [Cu]_o = [Ni]_o = 30mg/L$, Mass of AACs=0.2g,

# ENRICHMENT PROCESS FOR A PGM-METALS CONTAINING STREAM

CROSS-REFERENCE TO RELATED APPLICATIONS

This application is the national phase under 35 U.S.C. §371 of prior PCT International Application No. PCT/ZA2008/000067 which has an International filing date of Jul. 28, 2008, which designates the United States of America, and which claims the benefit of South Africa Application No. 2007/6234 filed Jul. 27, 2007, the disclosures of which are hereby expressly incorporated by reference in their entirety and are hereby expressly made a portion of this application.

FIELD OF THE INVENTION

The invention relates to a process for enriching the platinum content of a platinum containing stream.

BACKGROUND TO THE INVENTION

The concept of separating platinum anions from base metal cations in chloride media using native or chemically modified activated carbons has been discussed in various journals within the context of batchwise systems.

A variety of materials have been investigated for removal of metals from metallurgical effluents, ranging from inorganic materials to organic polymeric resins. Methods that have been applied to the recovery of precious metals from its solutions include zinc-dust cementation (Miller et al., 1990), carbon adsorption (Xu et al., 1995), solvent extraction (Wan and Miller, 1986; Mooiman and Miller, 1991) and ion exchange (Hubicki et al., 2006), precipitation coagulation, evaporation and membranes processes. A few authors have reported that commercial resins are unable to compete with activated carbons in terms of adsorption performance due to poor mechanical stability of the beads and inability to withstand complex elution and regeneration processes (Warshawsky et al., 2000).

Kasaini et al. 2005 developed a novel technique for recovering PGMs from dilute multi-component halide solutions using chemically modified adsorbents. However, this separation technique has not been tested on continuous fixed-bed adsorption columns. The work carried out in this study was focussed on separating platinum ion metal from base metals (iron and chromium) in fixed-bed columns containing native and chemically modified activated carbons.

Adsorption of metal ions on the surface of activated carbons takes place at the solid-liquid interface within and outside the pore structure. The charged metal ions are held strongly on the surface of activated carbons by either attractive forces (physical adsorption) or covalent bonds (chemisorption). The three major stages that accompany metal adsorption are as follows (Dinesh et al., 2005; Belgin, 2002): (a) Film diffusion, which is the transfer of adsorbate ions through the "surface film" surrounding solid particles, (b) Pore diffusion, whereby adsorbate molecules are transferred through the micropores to the adsorption sites, (c) Adhesion of the adsorbate ions to the surface of activated carbons prior to chemisorption or charge transfer complexation.

SUMMARY OF THE INVENTION

According to the invention, there is provided an enrichment process for a PGM-group metals containing stream, said process including the steps of:

a) contacting activated carbon particles with a PGM-rich stream by contacting the stream with a batch of the particles on a continuous basis, whereby at least some of the PGM-group metals are adsorbed from the stream onto active surface sites of the activated carbon and a PGM-metals depleted stream passes out of contact with the activated carbon batch;

b) stripping the PGM-group metals from the activated carbon batch by means of a concentrated HCl solution as stripping agent, wherein the stripping agent is contacted with the activated carbon batch on a continuous flow basis and the PGM-group metals loaded stripping agent is removed from contact with the activated carbon from which the PGM-group metals have been stripped; and c) regenerating the activated carbon batch by washing with water and, if necessary, reactivating the carbon particles.

The activated carbon particles and PGM-metals stream may be contacted in an adsorption zone of a agitated carbon-in-reactor vessel i.e. an ACIR vessel.

Optionally, an oxygen rich stream may be mixed with the PGM-metals stream either prior to or during the contact with the activated carbon in step a).

The oxygen rich stream may be an oxygen containing gas stream which is bubbled into the PGM-metals and activated carbon particles mixture i.e. the adsorption zone.

The rate of oxygen addition to the process may be sub-stoichiometric, however, typically the rate of oxygen addition is selected to achieve excess oxygen conditions.

The activated carbon batch may be agitated in the PGM-metals rich stream as the stream passes through and around the activated carbon particles which are retained in the batch.

The activated carbon may be in a bed with the PGM-metals rich stream being passed over the bed in a continuous flow.

The process may include separating at least some of the suspended solids from the PGM-metals rich stream thereby to reduce poisoning of the activated carbon active sites and/or blocking of the pores thereof.

The stripping agent may be HCl acid at a concentration of from 2 M to 5 M, typically from 3 M to 4 M.

The activated carbon may be amine treated activated carbon.

The washing step c) may include contacting the washed activated carbon with an amine containing stream.

The amines may be primary or secondary amines. Typically the amines are primary amines. It is believed that primary amines don't have a long alkyl chain so they diffuse and react with the surface in nano pores while secondary amines attach mostly on the surface therefore they cover a lesser surface area.

The washed activated carbon from step c) may be re-used, in-situ, to conduct step a) again with a fresh and/or recycled PGM-metals rich stream.

The ratio of the concentration of PGM-group metals in the PGM-metals rich stream and the loaded stripping agent may be higher than 2, typically around 10, or even higher.

The depleted PGM-metals stream may be recycled to step a) or discarded.

The loaded stripping agent may be recycled or taken for further processing.

SUMMARY OF THE DRAWINGS

The invention will now be described, by way of non-limiting example only, with reference to the accompanying diagrammatic drawings. In the drawings.

DESCRIPTION OF AN EXAMPLE OF THE PROCESS OF THE INVENTION

Example 1

The ACIR Process

Figure 1:
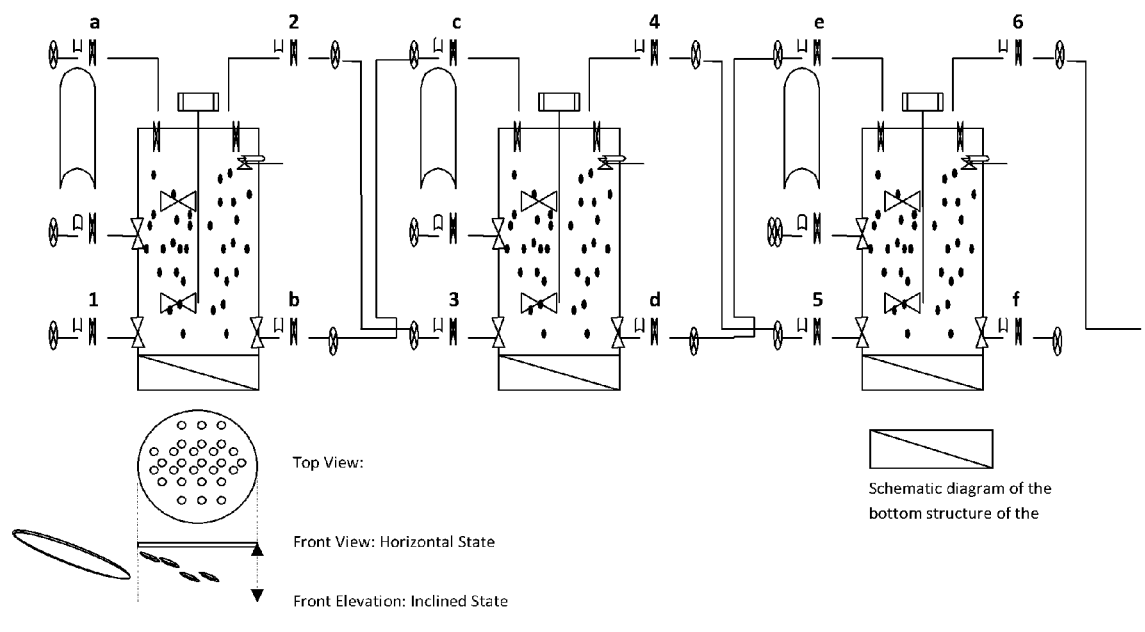
FIG. 1 shows an industrial application of the ACIR process of the invention.

An example of how the agitated carbon in reactor (ACIR) process may be carried out is set out below with reference to FIG. 1.

Carbon Loading:

Activated carbon particles are enclosed inside a cylindrical process vessel, such as that which forms the subject matter of a co-filed patent application entitled "Process Vessel" the contents of which are incorporated herein by reference in so far as they are required for the understanding of the present invention. The activated carbons are kept in suspension in a PGM-metals stream to be stripped by mechanical agitation.

In operation, PGM-rich solution enters the reactor through point 1 and is contacted with agitated carbon particles. The PGM-depleted solution (barren solution) leaves the reactor at point 2. For continuous series flow configuration mode, barren solution is routed to the next reactors through points 3, 4 and 5. Carbon particles become loaded with PGMs when the PGM-rich solution is continuously recycled through the reactors through points 1, 2, 3, 4, 5 and 6.

The PGM-depleted solution is discarded.

Carbon Stripping:

Valves 1, 2, 3, 4, 5 and 6 are closed. Agitation is stopped. The PGM-depleted solution which is in the vessels at that time, bearing in mind the constant flow thereof through the vessels, is drained through point Z. In addition, most of the suspended solids held at the inclined, impermeable floor are washed down through the drainage point (Z).

Valves a, b, c, d, e, f and X are opened. The stripping solution, being a 3.5 to 4 M HCl solution, enters the vessel through point a and exits at point b. The oxygen-rich gas enters through point X. For continuous series flow configuration mode, stripping solution is routed to the next reactors through points c, d and e. Carbon particles become stripped of PGMs when the PGM-rich solution is continuously recycled through the reactors via points a, b, c, d, e and f.

The stripping solution becomes loaded with PGMs.

Carbon Regeneration:

The valves a, b, c, d, e, f and X are closed. Agitation is stopped. The stripping solution is drained and recovered as precious solution. Valve 1 and 2 are opened. An aqueous solution enters via point 1 and as soon as aqueous level reaches the impeller lever, agitation is started. The aqueous solution is contacted with stripped carbons to drive off residual acid solution. The wash solution exits the reactor through point 2. Under series flow configuration, the wash solution is recycled through all the reactors via points 3,4,5 and 6. When carbons are washed sufficiently, valves, 1,2,3,4,5 and 6 are closed. Agitation is stopped. The drain valve Z is opened and the aqueous solution is drained completely. Drain valve is closed.

For regenerating amine-treated activated carbons, the organic solution containing amino groups enters simultaneously via points 1, 3 and 5. The valves 2, 4 and 6 remain closed. When the amine solution reaches the level of the impeller, agitation is resumed until sufficient amino groups are anchored onto the surface of activated carbons. The valves 1, 3, and 5 are closed and agitation stopped. The amine solution is drained and stored.

The carbon material is ready for the loading cycle again.

Alternatively, the washed carbons may be offloaded from the vessel by collapsing the bottom floor and hosing the carbons into a holding vessel held below the drainage point X. The carbons are dried, heated to particular temperature to reactivate the surface. The dry activated carbon particles are loaded into the vessel through point Y. The amine solution is contacted with dry activated carbons for adequate time until sufficient amino groups are anchored or immobilized on the surface of activated carbons. The amino solutions drained through point Z.

The carbon material is ready for the loading cycle.

Example 2

Figure 2:
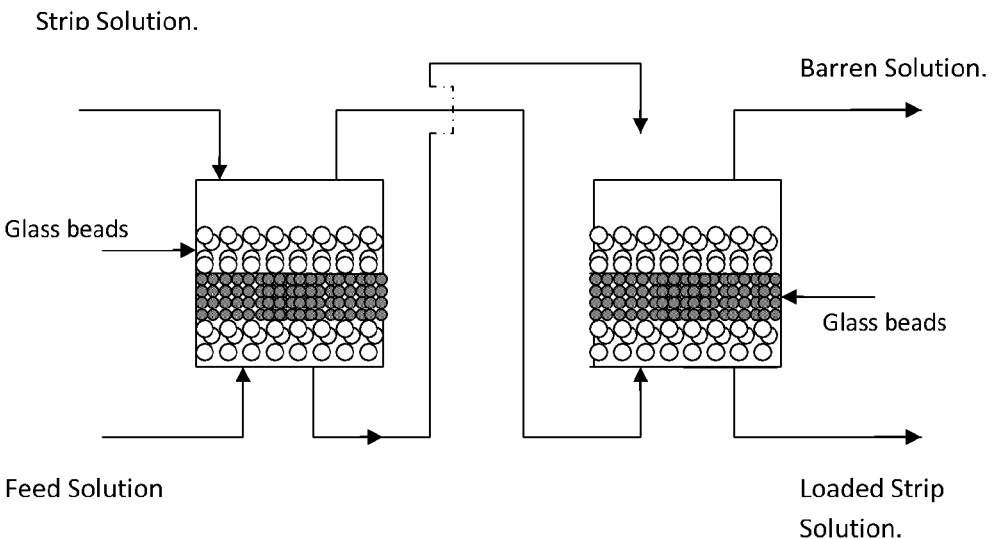
FIG. 2 shows a laboratory configuration for the use of a fixed activated carbon bed for adsorbing PGM-metals onto amine treated activated carbon.

Laboratory Testing of Adsorption of PGM-Metals from a Continuous PGM-Metals Rich Stream onto Both a Static and an Agitated Batch of Activated Carbon In this example, as shown in FIG. 2, a static batch of activated carbon i.e. an amine treated activated carbon bed is used to adsorb PGM-metals from the PGM-metals rich stream. This is compared to the use of an agitated batch of amine treated activated carbon.

The results of the laboratory tests are shown in Tables 1 to 4 below.

TABLE 1

Carbon Loading

Figure 3:
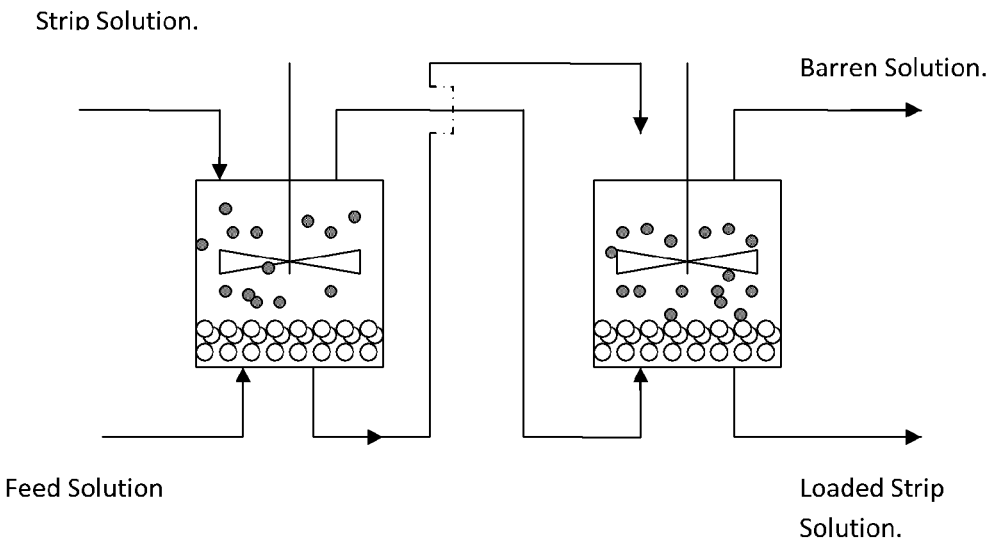
FIG. 3 shows a laboratory configuration for the use of an agitated activated carbon batch for adsorbing PGM-metals onto amine treated activated carbon.

| | Fixed bed Process FIG. 2 | ACIR FIG. 3 |
|---|---|---|
| Initial Feed | 10 mg/L, Pt | 5-10 mg/L, Pt |
| | 100 mg/L, Fe | 100 mg/L, Fe |
| | 100 mg/L Cr | 100 mg/L Cr |
| | pH = 2.0-2.9 | pH = 2.0-2.9 |
| | (HCl media) | (HCl media) |
| Feed rate | 9.1 mL/min | 9.1 mL/min |
| Carbon Loading | 3 g | 2.5 g |
| Barren Solution | 2.14 | 0.84 |
| Total solution recirculated | 20 L | 20 L |
| Time taken | 16 Hrs | 16 Hrs |
| RESULTS | | |
| Pt loaded onto carbon surface | 157 mg | 183.2 mg |
| Loading capacity | 52.4 mg/g | 73.3 mg/g |
| Extraction Efficiency | 78.6% | 91.6% |
| Distribution Coefficient (metal on solids (mg)/Metal left in soln (mg).) | 3.65 | 10.9 |

TABLE 2

Carbon Stripping

|  | FIXED BED PROCESS FIG. 2 | ACIR PROCESS FIG. 3 | |
| --- | --- | --- | --- |
|  |  | Without $O_2$ addition | With $O_2$ addition |
| Initial Stripping Solution | 4 M, HCl (pure solution) | 4 M, HCl (pure solution) | 4 M, HCl (pure solution) |
| Feed rate | 6.7 mL/min | 6.7 mL/min | 6.7 mL/min |
| Carbon Loading | 3.0 g | 2.5 g | 2.5 g |
| Total Strip Soln used | 1 L | 1 L | 1 L |
| RESULTS | | | |
| Mass of Pt stripped from carbon | 70 mg | 154.4 mg | 178.4 mg |
| Final Conc of Loaded Strip Soln | 70 mg/L | 154.4 mg/L | 178.4 mg/L |
| Stripping Efficiency | 44.8% | 84.3% | 97.3% |
| Time taken | 24 | 24 | 24 |

TABLE 3

Carbon Stripping: Assessing the effect of O2 on co-stripping of base metal impurities like Cr.
Table 3 highlights the co-stripping of base metals from the AC surface when oxygen is bubbled into the solution. The concentration of Cr increased only by 5 ppm in solution, which is insignificant considering that platinum concentration was 178 ppm . . .

|  | ACIR process, FIG. 3 without $O_2$ addition | | ACIR process, FIG. 3 with $O_2$ addition | |
| --- | --- | --- | --- | --- |
|  | Pt | Cr | Pt | Cr |
| Initial Stripping Solution | 4 M, HCl (pure solution) | 4 M, HCl (pure solution) | 4 M, HCl (pure solution) | 4 M, HCl (pure solution) |
| Feed rate | 6.7 mL/min | 6.7 mL/min | 6.7 mL/min | 6.7 mL/min |
| Carbon Loading | 2.5 g | 2.5 g | 2.5 g | 2.5 g |
| Total Strip Soln used | 1 L | 1 L | 1 L | 1 L |
| Mass of Pt stripped from carbon | 154.4 mg | 3.48 mg | 178.4 mg | 3.7 mg |
| Final Conc of Loaded Strip Soln | 154.4 mg/L | 3.48 mg/L | 178.4 mg/L | 8.7 mg/L |
| Stripping Efficiency | 84.3% | 16.1% | 97.3% | 41.0% |
| Time taken to recirculate solution across the reactor | 24 | 24 | 24 | 24 |

TABLE 4

Carbon Stripping: Fixed-bed Column

|  | Fixed-bed Column | |
| --- | --- | --- |
|  | Pt | Cr |
| Initial Stripping Solution | 4 M, HCl (pure solution) | 4 M, HCl (pure solution) |
| Feed rate | 6.7 mL/min | 6.7 mL/min |
| Carbon Loading | 3.0 g | 3.0 g |
| Total Strip Soln used | 1 L | 1 L |
| Mass of Pt stripped from carbon | 119.26 mg | 2.45 mg |
| Final Conc of Loaded Strip Soln | 119.26 mg/L | 2.45 mg/L |
| Stripping Efficiency | 65.1% | 11.6% |
| Time taken to recirculate solution across the reactor | 24 | 24 |

Example 3

Platinum Adsorption On Amine-Treated Activated Carbons

Batch wise adsorption tests for platinum (Pt) on the surface of activated carbon pellets (Norit RO 0.8 BET surface area 1100 mg/g) were carried out in mixed chloride solution.

This was done to assess and compare the adsorption performance of amine-treated activated carbons (AACs) and native activated carbons (NACs) in terms of adsorption capacity and selectivity. The effect of pH and temperature on adsorption capacity and selectivity was established. The amine-treated ACs were prepared by anchoring the amino groups (butyl amines) on the surface of AC pellets in aqueous media and the UV-Vis was used to determine the amount of amine sequestered from solution by ACs. The dosage of butyl amine on the surface of ACs averaged 0.15 g/g, carbon.

The adsorption mechanism was described by the ionization and complexation model whereby interaction between the protonated AAC surface and the anionic chlorocomplex ions ($PtCl_5[H_2O]^-$, $PtCl_6^{2-}$) proceeded by either electrostatic attraction or/and by covalent bonding [$(NH_3)_2PtCl_6$ or $(CH_2COO)_2PtCl_6$]. By comparison, the adsorption capacities of Pt on amine-treated ACs and native ACs were 53.8 mg/g and 33.03 mg/g, respectively which highlight the benefits of anchoring functional molecules on ACs. The selectivity of AACs was influenced by solution pH. Pt adsorbed selectively on the surface of amine-treated ACs at pH<1.5. The highest separation factor that was recorded pertained to Pt and Fe species ($\beta_{Pt/Fe}$=90) then followed by Pt and Ni species ($\beta_{Pt/Ni}$=30) or Pt and Cu species ($\beta_{Pt/Cu}$=15). The lowest separation factor was recorded for Pt and Cr ions ($\beta_{Pt/Ni}$=5).

Adsorption kinetics of Pt on amine-treated AC surfaces, according to the first and second order reactions, were investigated and results showed that rates were in the order $10^{-4}$ $min^{-1}$ and $10^2$ g·min/mg, respectively. The pseudo $1^{st}$ order kinetics predicted the adsorption capacity of 51.81 mg/g which was almost similar to the experimental value (53.8 mg/g) while the second order rate equation predicted Pt adsorption capacity of 40.1 mg/g. Both The Langmuir and Toth isotherm fitted the Pt adsorption at pH<1.0. The Freundlich isotherm tended to underestimate the adsorption capacity of AACs.

Experimental

Reagents

All the standard solutions for metals (Cr, Cu, Pt, Fe and Ni) were of analytical grade assaying 1000 mg/L each. Commercially available activated carbon pellets (Norit 0.8) were purchased from Norit USA. 99% pure analytical grade butyl amine was purchased from Aldrich, Germany.

The properties of the ACs are shown in Table 6. Solution metal assays were determined by means of an Inductively Coupled Plasma instrument (ICP).

TABLE 6

Physical Properties of Norit 0.8 Activated Carbons

| Characteristics | Value |
| --- | --- |
| Particle form (—) | Pellets |
| Particle size (mm) | 1 mm |
| Iodine number (—) | 1000 min. |
| Molasses number | 450 max |
| Unit Surface Area (m$^2$/g) | 900 ± 50 |
| Pore volume (cm$^3$) | 0.50 |
| Pore diameter (nm) | 19 |
| Apparent Bulk density (g/cm$^3$) | 0.53 |
| Loss on attrition (wt % minimum) | 0.21 |
| Loss on ignition (wt %) | 6.5 |
| Slurry pH | 11.5 |
| Phenol adsorption capacity | 100 mg/g |

Preparation of Modified Activated Carbons

Activated carbon (AC) pellets were kept in desiccators for 48 hours before use in order to prevent the adsorption of moisture and subsequent loss of active sites. Known weights of the activated carbon pellets (Norit 0.8 USA) were brought into contact with 100 mL of amine solution. A mixture of ACs and butyl amine solution was placed in an air-tight glass beaker and agitated mildly in a mechanical shaker (SA Labotec, model 202) for 24 hours. After equilibrium had been reached, the AC pellets were filtered off by using a filter paper, Macherey Nagel 640 diameter 125 mm. The amine-treated activated carbons (AACs) were stored in air-tight desiccators. The initial concentration of butyl amine in impregnating solution was varied in the range 0.05-0.75 g, amine/g, carbon and the residual amount of butyl amine in solution was measured by using the UV-Vis.

Batch Adsorption Procedures

Batch tests were carried at in a solid-liquid ratio of 0.20-0.75 g:50-250 mL to assess the selectivity property of AACs and adsorption capacity In the case of assessing the separators, the initial metal concentration in the mixture (Fe, Cu, Cr, Ni and Pt) were kept the same at 30 mg/L and the contact time was 3 hours. This experimental condition was set mainly to diagnose and assess the initial adsorption characteristics of Pt in a multi-component media of equimolar metal concentration. In subsequent batch tests, the contact time was increased to 24 hours to evaluate the maximum adsorption capacity of ACs. After 24 hours, the reaction was assumed to have reached equilibrium state and the solids were separated from the solution using a filter paper. Subsequently, the residual solution was analyzed for metal ions using ICP-MS (inductively coupled plasma-mass spectrophotometer). In other batch tests, the temperature of the feed solution was varied between 30 and 60° C. to evaluate the effect of temperature on adsorption and implicitly determine the stability of amino groups on the surface of ACs.

Effect of Feed pH on Pt Adsorption and Selectivity

Figure 4:
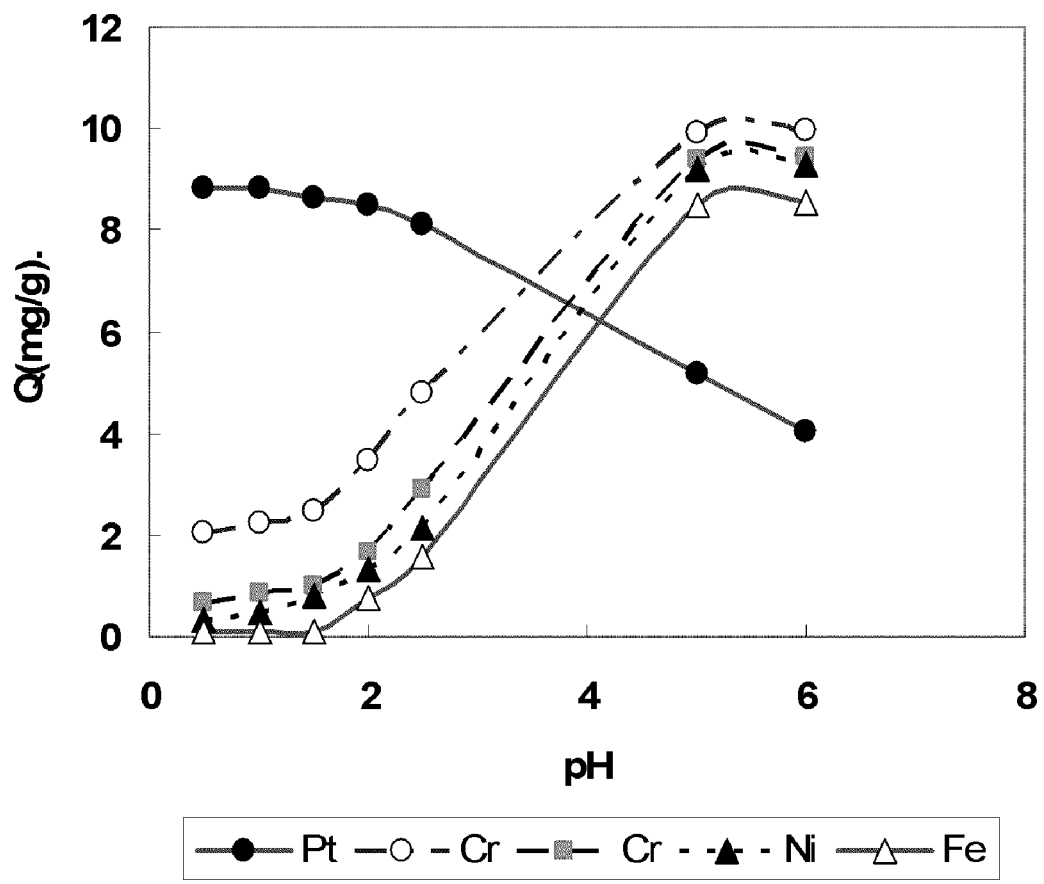
FIGS. 4 to 10 illustrate results from experiments on platinum adsorption on amine-treated activated carbons.

FIG. 4 illustrates the adsorption profile of Pt from a mixed chloride solution in the first 3 hours of contact time. It is clear that Pt adsorption is influenced strongly by solution pH. Platinum was adsorbed selectively from the mixture in the pH range of 0.5-1.0. It is known that amino groups (R—NH$_2$) groups on the surface of AC pellets are readily protonated in highly acidic media and the presence of excess protons on the AC surface enhances the attractive interaction between anionic platinum complex ions and protonated surface (.(R—NH$_3^+$). This interaction between the amino groups on the AACs' surface and the Pt chlorocomplex ions has been reported in literature [Fujiwara et al. 2007. Kasaini et al. 2001]

(reaction 1)

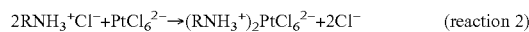

(reaction 2)

Figure 5:
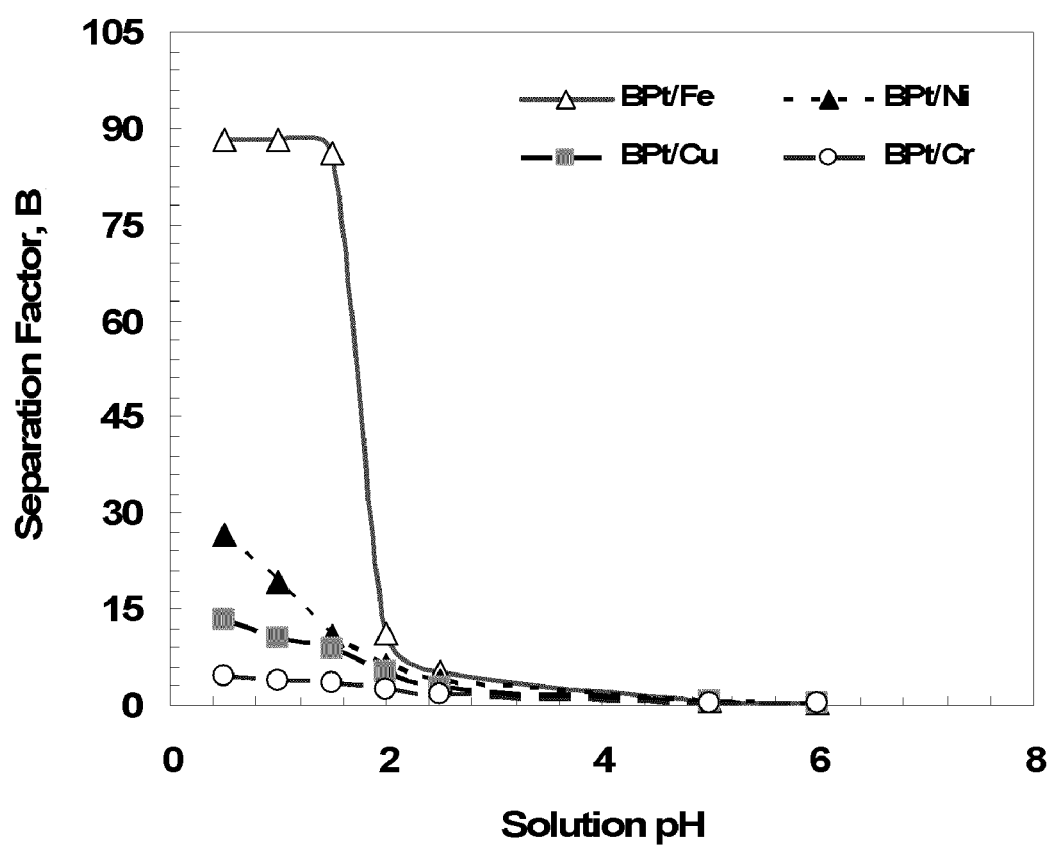

From FIG. 5, it was found that the amount of adsorbed base metals was small at low pH but their adsorption increased significant after a pH 3.0 which indicated a reversal of the charge profile on the surface of amine-treated ACs. Initially, cationic species were repelled by the protonated carbon surface. Adsorption of base metals was found to be highly favorable at pH>5. This result was attributed to the deprotonation of the amine-treated AC surface. FIG. 1b illustrates the effect of solution pH on separation factors. The order of separation was in the order $\beta_{Pt/Fe}=90>\beta_{Pt/Ni}=30>\beta_{Pt/Cu}=15>\beta_{Pt/Cr}=5$.

Adsorption Capacity

Figure 6:
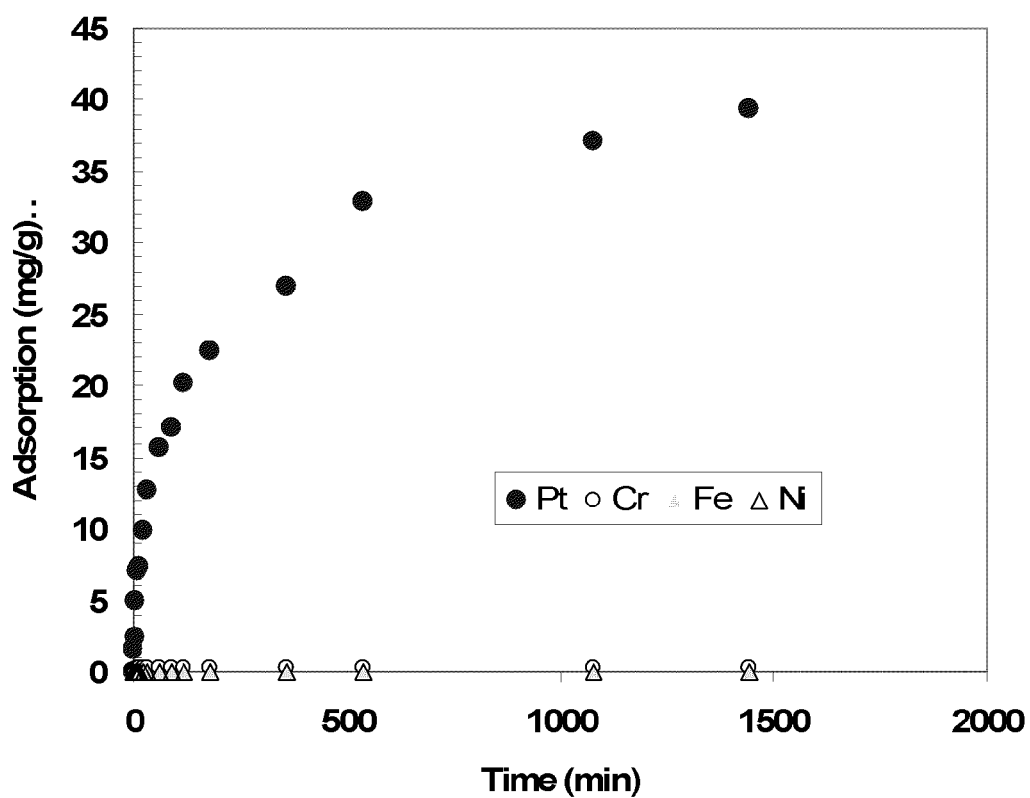
Figure 7:
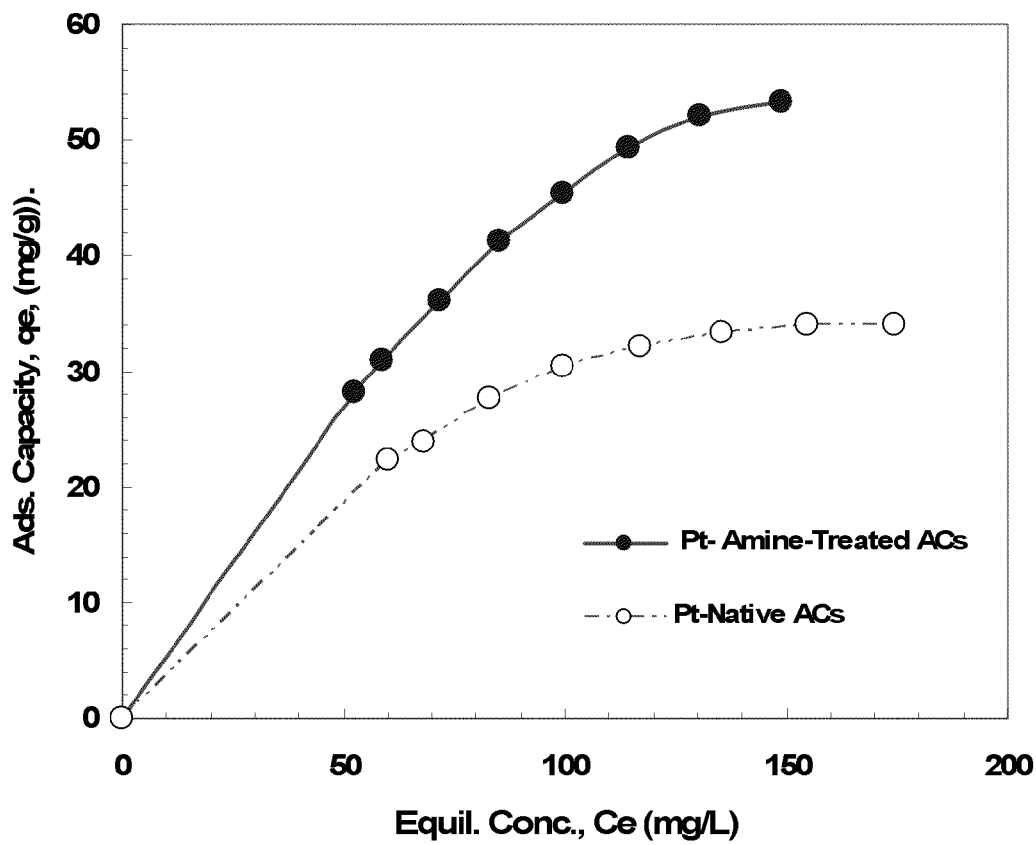

FIG. 6 illustrates the adsorption characteristics of Pt, Ni, Cu, Fe and Cr in mixed solution at pH<1.0. Base metal ions did not adsorb on amine-treated ACs at low pH. Pt adsorption strongly and reached a maximum of 53.25 mg/g after 24 hours. By comparison, AACs showed a higher affinity towards platinum than Native-ACs as illustrated by FIG. 7. About 33.6 mg/g of Pt was adsorbed on the native AC pellets. There were no base metals in the solution (FIG. 7.)

Adsorption Kinetics

Figure 8:
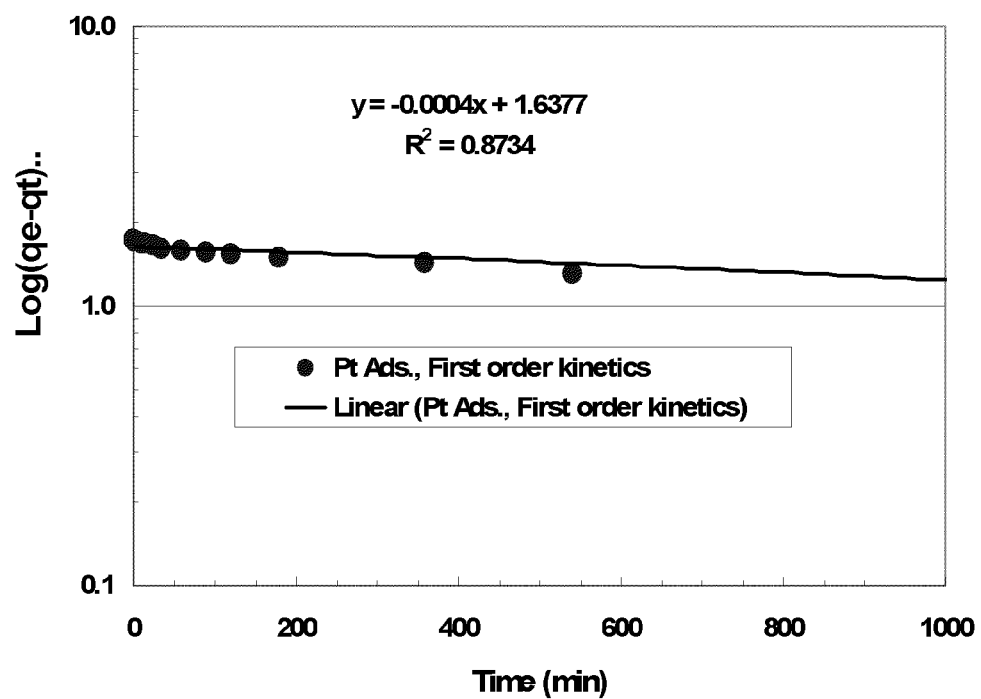

FIG. 8 shows that platinum adsorption kinetics according to the pseudo 1$^{st}$ order kinetics. The maximum adsorption capacity can be estimated from the intercept of the graph (FIG. 8). The rate constant was estimated to be of the order $10^{-4}$ min$^{-1}$ at 303 K. The maximum adsorption capacity estimated from the rate equation was about 48.68 mg/g.

Figure 9:
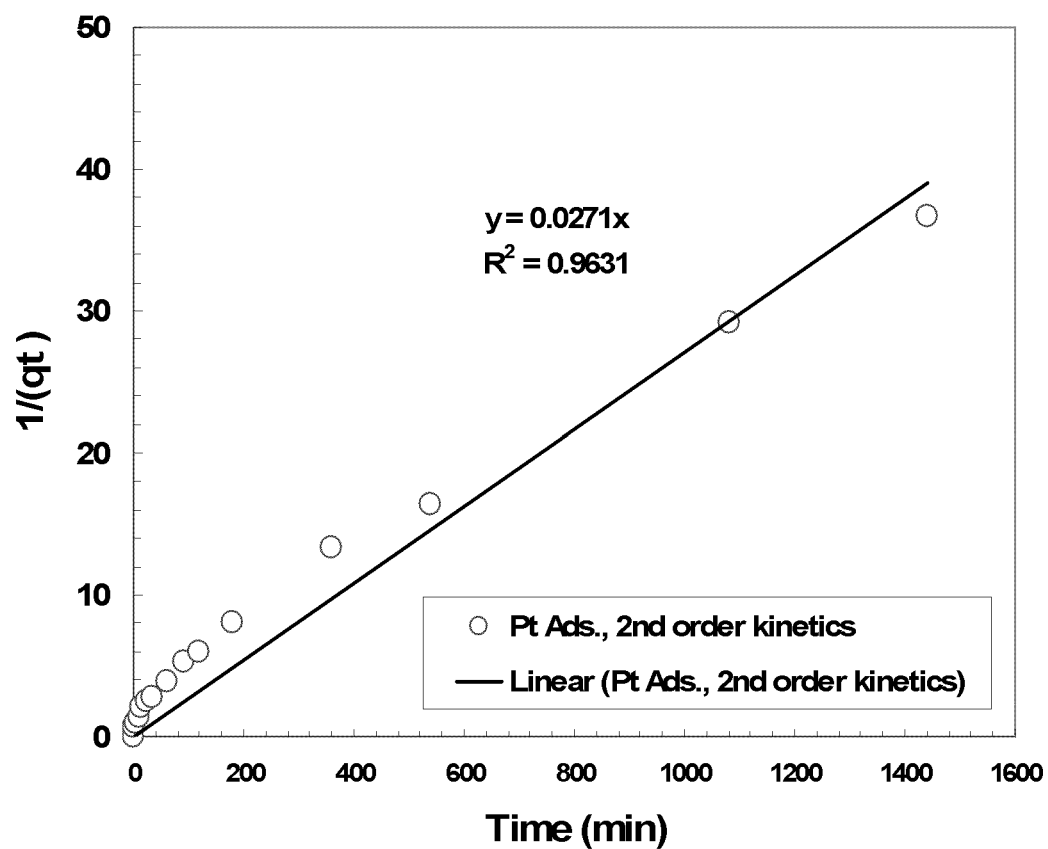

FIG. 9 illustrates the adsorption kinetics according to pseudo second order kinetics for the single component system. The 2$^{nd}$ order kinetics did not describe adsorption of Pt on the surface of amine-treated ACs accurately since adsorption capacity calculated from this rate equation did not predict the experimental value. Adsorption rate constant was found to be of the order $10^2$ (g·min/mg).

Figure 10:
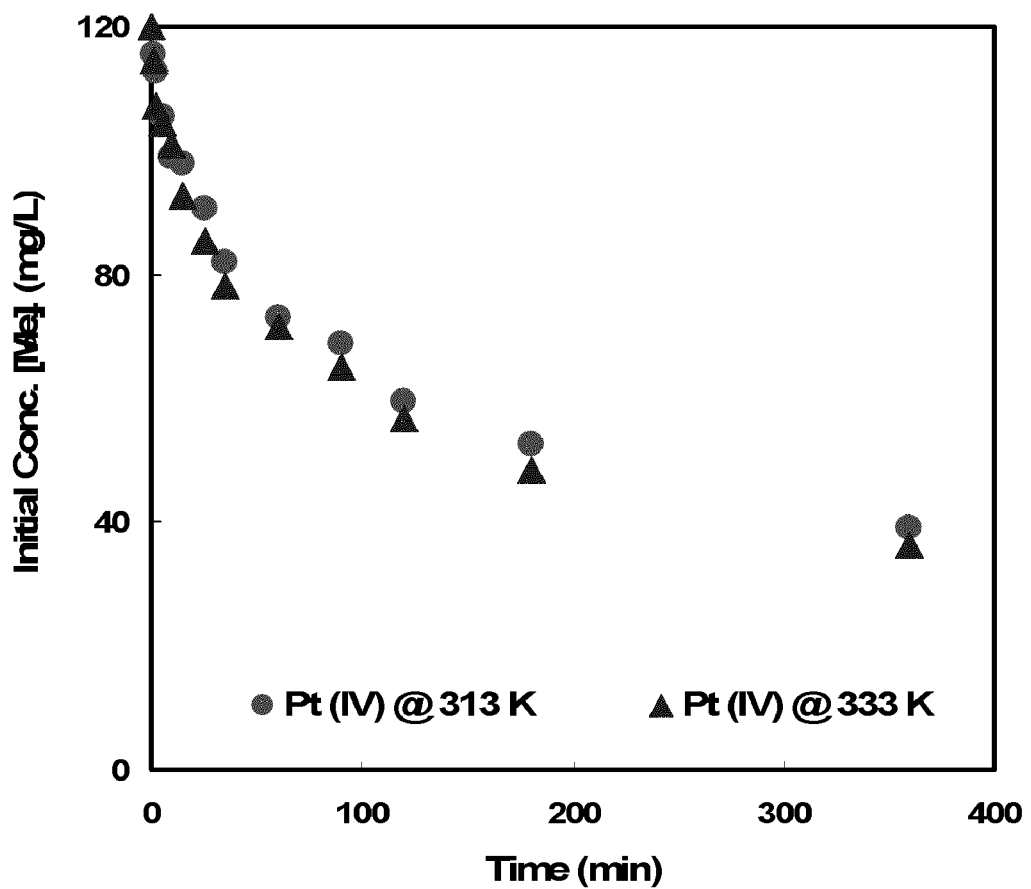

FIG. 10 shows the adsorption of Pt at two different solution temperatures, 30° C. and 60° C. This data confirms that the amino groups were not decomposed by raising the solution temperature and adsorption was basically constant. The contact time, however, was not sufficient to make a conclusive statement. The mixture of AACs and solution were kept at high temperature for 6 hours.

Thus, by anchoring amino groups (Butyl amine) on the surface of AC pellets, the selectivity of ACs towards platinum ions in chloride media was demonstrated at low pH conditions (pH>1.0). The presence of base metal impurities (Fe, Ni, Cr, Cu and Cr) reduced the adsorption capacity of amine-treated ACs by 20% when the solution pH exceeded 2.9. The pseudo 1$^{st}$ order kinetics described the adsorption of Pt well and the rate constant averaged 1.23×10$^{-4}$ min$^{-1}$. The chemically modified ACs were tested at high temperature (60° C.)

and the performance was not affected adversely confirming the stability of amino groups on the AC surface within 6 hours of contact time.

Example 4

Adsorption of Platinum Ions in Fixed-bed Columns and ACIL Reactors Containing Activated Carbons The adsorption of platinum ions from mixed chloride solutions on amine-treated activated carbon (AC) pellets in fixed bed and stirred contacting devices was investigated. Further, a comparison was made between these units on the basis of mass transfer and selectivity parameters.

A fixed-bed column, loaded with activated carbon (AC) pellets (Norit RO 0.8), was used to study selective adsorption of platinum ions at different flow rates, bed depth and initial metal concentrations. For comparison purposes, an agitated-carbon-in-liquid (ACIL) reactor was also used to study platinum adsorption under the similar conditions. Results showed that in the ACIL process, platinum ions were completely (99%) adsorbed in less than 1 hour compared to 24 hours in fixed-bed columns indicating that resistance to mass transfer in the ACIL contactor was significantly low. Better separation factors ($>10^2$) and high mass transfer rates presents the ACIL process as an alternative method to the carbon-in-liquid (CIL) process.

Pre-Treatment of ACs

Norit-08 AC pellets (BET surface area=1150 $m^2/g$) were purchased from Norit USA and used after drying in an oven at 80° C. for 24 hours. The pellets were immersed in a solution containing pure primary amine solution for 24 hours and then filtered off and dried in a dessicator.

Procedures: Batch Tests

The batch tests were performed by mixing 0.2 g of norit amine-treated activated carbons with 50 mL of metal-rich solution. To assess the separation factors, metals were prepared in equal concentrations (100 mg/L) in chloride media. All tests were carried out by agitating the samples in air-tight bottles in a thermostated water bath.

Procedures: Fixed-Bed Column

All the adsorption tests were conducted in continuous upward flow mode. Prior to usage, the ACs were treated with primary amine solutions at 40° C. The activated carbon pellets were inserted between two layers of glass beads and wool in the column of diameter 3 cm. The bed depth was varied between 1.0 to 2.5 cm. The flow of feed solution from the bottom side was varied between 3-11.1 mL/min. The initial metal (Pt and Fe) concentration in the feed solution was in the range 5-10 ppm (pH 2.0). The elution cycle was carried out by feeding the column with 4M, HCl acid solution in upward flow mode. Solution samples were drawn at intervals from the discharge line at the top.

Procedures: ACIL Reactor

The column, diameter 6 cm, was fitted with a glass impeller. The feed solution (pH 2.0) with an assay of 5-10 ppm Pt was fed continuously through the bottom of the column while elution was conducted in the opposite direction. The eluant was 4M HCl acid solution. The amine-treated carbon pellets were poured into the column and agitation started (500 rpm) keeping all the pellets in suspension. The peristaltic pump was started immediately after resuming mixing. Samples were drawn at intervals from the discharge line at the top.

Results

The potential of amine treated ACs (dosage=0.1 mg/g, amine) to separate platinum from base metals like iron shows that when iron and platinum were mixed in equal proportion it is clear that a low dosage of amino groups on the surface of ACs is required to induce the selectivity properties for platinum.

The agitated-carbon-in-liquid process yielded better separation factors for platinum from a mixed chloride solution in the order of $10^4$ at various solution flow (3-11 mL/min). Also, the mass transfer coefficient of platinum onto the surface of ACs was almost over ten times better ($10^{-3}$ m/s) compared to mass transfer coefficients in fixed-bed columns ($10^{-4}$-$10^{-5}$ m/s). In the ACIL process, adsorption was completed within 1 hr compared to over 12 hours in a fixed-bed column. However, mass transfer coefficients in fixed-bed contactors were increased at low solution flows although there was a set back in bed service time. Similarly, reducing the aspect ratio of the bed into the range 0.3-0.5 helped to enhance mass transfer in the carbon bed and thus improved adsorption.

The attrition of carbon particles due to shear on impellers and collisions between particles was not observed in the ACIL process at the solid:solvent ratio of 1:1000.

The invention claimed is:

1. An enrichment process for a stream containing platinum group metals, comprising:
   contacting, on a continuous basis, a batch of activated carbon particles with a platinum group metal-containing stream, wherein the activated carbon particles are amine treated activated carbon particles, whereby at least a portion of the platinum group metal is adsorbed from the platinum group metal-containing stream onto active surface sites of the activated carbon particles so as to generate a platinum group metal-depleted stream;
   passing the platinum group metal-depleted stream out of contact with the batch of activated carbon particles with adsorbed platinum group metal;
   contacting, on a continuous basis, the batch of activated carbon particles with adsorbed platinum group metal to a concentrated HCl solution stripping agent, whereby a platinum group metal-loaded stripping agent is generated;
   removing the platinum group metal-loaded stripping agent from contact with the batch of activated carbon particles from which the platinum group metal has been stripped; and
   regenerating the activated carbon particles from which the platinum group metal has been stripped by washing with water.

2. The enrichment process of claim 1, further comprising reactivating the batch of activated carbon particles after regenerating.

3. The enrichment process of claim 1, wherein contacting, on a continuous basis, a batch of activated carbon particles with a platinum group metal-containing stream occurs in an adsorption zone of an agitated carbon-in-reactor vessel.

4. The enrichment process of claim 3, wherein an oxygen rich stream is mixed with the platinum group metal-containing stream prior to or during contacting, on a continuous basis, the batch of activated carbon particles with the platinum group metal-containing stream.

5. The enrichment process of claim 4, wherein the oxygen rich stream is an oxygen containing gas stream which is bubbled into a mixture of the platinum group metal-containing stream and the batch of activated carbon particles in an adsorption zone.

6. The enrichment process of claim 4, wherein a rate of oxygen addition is sub-stoichiometric.

7. The enrichment process of claim 4, wherein a rate of oxygen addition is selected to achieve excess oxygen conditions.

8. The enrichment process of claim 1, wherein the batch of activated carbon particles is agitated in the platinum group metal-containing stream as the platinum group metal-containing stream through and around the activated carbon particles which are retained in the batch.

9. The enrichment process of claim 1, wherein the batch of activated carbon particles is in a bed with the platinum group metal-containing stream being passed over the bed in a continuous flow.

10. The enrichment process of claim 1, further comprising separating at least a portion of suspended solids from the platinum group metal-containing stream so as to reduce poisoning of the active surface sites of the activated carbon particles and/or to reduce blocking of pores of the activated carbon particles.

11. The enrichment process of claim 1, wherein a concentration of the concentrated HCl solution stripping agent is from 2 M to 5 M.

12. The enrichment process of claim 1, wherein a concentration of the concentrated HCl solution stripping agent is from 3 M to 4 M.

13. The enrichment process of claim 1, wherein the regenerated activated carbon particles are re-used, in-situ, in contacting the platinum group metal-containing stream, and wherein the platinum group metal-containing stream is fresh or recycled.

14. The enrichment process of claim 1, wherein a ratio of a concentration of platinum group metal in the platinum group metal-containing stream to the platinum group metal-loaded stripping agent is higher than 2.

15. The enrichment process of claim 1, wherein a ratio of a concentration of platinum group metal in the platinum group metal-containing stream to the platinum group metal-loaded stripping agent is about 10 or higher.

16. The enrichment process of claim 1, wherein the platinum group metal-depleted stream is discarded or further contacted with the batch of activated carbon particles.

17. The enrichment process of claim 1, wherein the platinum group metal-loaded stripping agent is recycled or taken for further processing.

18. An enrichment process for a stream containing platinum group metals, comprising:
  contacting, on a continuous basis, a batch of activated carbon particles with a platinum group metal-containing stream, whereby at least a portion of the platinum group metal is adsorbed from the platinum group metal-containing stream onto active surface sites of the activated carbon particles so as to generate a platinum group metal-depleted stream;
  passing the platinum group metal-depleted stream out of contact with the batch of activated carbon particles with adsorbed platinum group metal;
  contacting, on a continuous basis, the batch of activated carbon particles with adsorbed platinum group metal to a concentrated HCl solution stripping agent, whereby a platinum group metal-loaded stripping agent is generated;
  removing the platinum group metal-loaded stripping agent from contact with the batch of activated carbon particles from which the platinum group metal has been stripped; and
  regenerating the activated carbon particles from which the platinum group metal has been stripped by washing with water, wherein washing comprises contacting washed activated carbon with an amine containing stream.

19. The enrichment process of claim 18, wherein amine containing stream is a primary amine containing stream or a secondary amine containing stream.

* * * * *